United States Patent
Markish et al.

(10) Patent No.: US 12,261,378 B2
(45) Date of Patent: Mar. 25, 2025

(54) APPARATUS, AND SYSTEM OF A STACK SERIES FED ANTENNA INCLUDING A PLURALITY OF ANTENNA LAYERS

(71) Applicant: INTEL CORPORATION, Santa Clara, CA (US)

(72) Inventors: Ofer Markish, Ra'anana (IL); Hila Hazenshprung, Tirat Yehuda (IL)

(73) Assignee: INTEL CORPORATION, Santa Clara, CA (US)

( * ) Notice: Subject to any disclaimer, the term of this patent is extended or adjusted under 35 U.S.C. 154(b) by 581 days.

(21) Appl. No.: 17/483,416

(22) Filed: Sep. 23, 2021

(65) Prior Publication Data

US 2022/0013912 A1    Jan. 13, 2022

(51) Int. Cl.
*H01Q 9/04* (2006.01)
*H01Q 1/32* (2006.01)
*H01Q 1/40* (2006.01)
*H04B 7/0413* (2017.01)

(52) U.S. Cl.
CPC ......... *H01Q 9/0414* (2013.01); *H01Q 1/3283* (2013.01); *H01Q 1/405* (2013.01); *H01Q 9/045* (2013.01); *H04B 7/0413* (2013.01)

(58) Field of Classification Search
CPC .... H01Q 1/405; H01Q 1/3283; H01Q 9/0414; H01Q 9/045; H01Q 1/02; H01Q 1/3233; H01Q 1/42; H01Q 13/206; H01Q 21/08; H01Q 21/28
See application file for complete search history.

(56) References Cited

U.S. PATENT DOCUMENTS

| 5,528,249 A | 6/1996 | Gafford et al. |
| 2017/0005405 A1 | 1/2017 | Kim |
| 2020/0110155 A1* | 4/2020 | Cho ............... G01S 7/027 |
| 2021/0273343 A1 | 9/2021 | Takeda |

FOREIGN PATENT DOCUMENTS

CN    110828963    2/2020

OTHER PUBLICATIONS

Z. An and M. He, "Design of a Broadband Radome-Enclosed Dual-Polarization Antenna Array Covering Sub-6 GHz Band with Differential Feeding," International Journal of Antennas and Propagation, 2020. pp. 1-17.
Z. Yu-wei, et al., "The Simulation Design of a Low-Side Lobe Level High Gain and Broadband Microstrip Patch Antenna Array," International Symposium on Antennas and Propagation, 2016. pp. 742-743.
Search Report for European Patent Application No. 22182265.3, mailed on Nov. 30, 2022, 7 pages.

* cited by examiner

*Primary Examiner* — Hoang V Nguyen
(74) *Attorney, Agent, or Firm* — Shichrur & Co.

(57) ABSTRACT

For example, an apparatus may include a radome; and a stack series fed antenna including a plurality of antenna layers, the plurality of antenna layers including a first antenna layer on an inner surface of the radome, the first antenna layer including a first plurality of serially connected antenna elements, and a first trace configured to drive an electrical current from a power source to the first plurality of serially connected antenna elements; and a second antenna layer covered by the inner surface of the radome, the second antenna layer including a second plurality of serially connected antenna elements, and a second trace configured to serially connect the second plurality of serially connected antenna elements to a Radio Frequency (RF) chain.

23 Claims, 14 Drawing Sheets

APPARATUS, AND SYSTEM OF A STACK SERIES FED ANTENNA INCLUDING A PLURALITY OF ANTENNA LAYERS

TECHNICAL FIELD

Aspects described herein generally relate to a stack series fed antenna including a plurality of antenna layers.

BACKGROUND

Multiple Input Multiple Output (MIMO) radar is a technology that allows reduction of a physical array aperture and a number of antenna elements. For example, the MIMO radar utilizes transmission of orthogonal signals from a transmit (Tx) array with a plurality of elements, and processing received signals via a receive (Rx) array with a plurality of elements.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
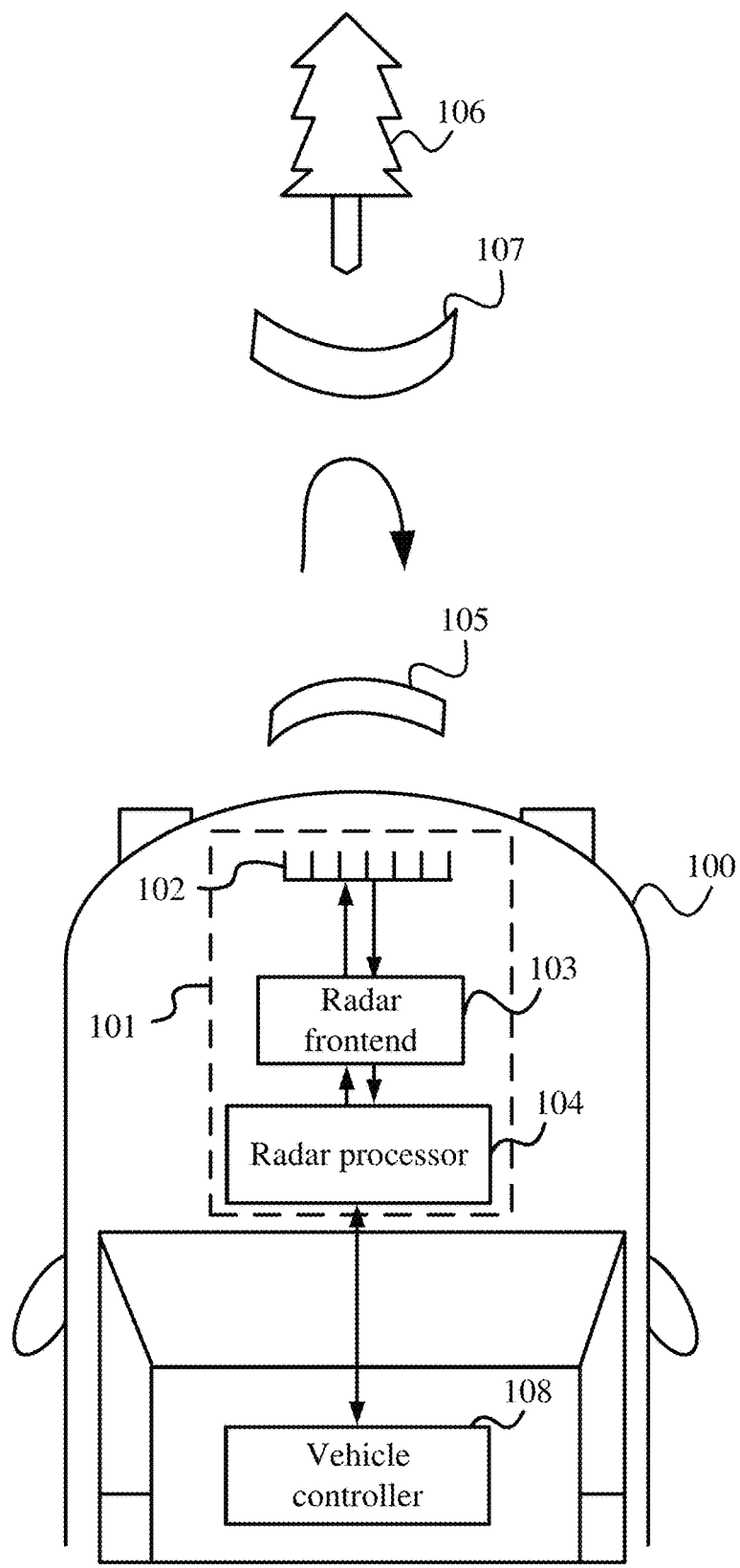
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, aspect, or design described herein as "exemplary" or "demonstrative" is not necessarily to be construed as preferred or advantageous over other aspects, aspects, or designs.

References to "one aspect", "an aspect", "demonstrative aspect", "various aspects" "one aspect", "an aspect", "demonstrative aspect", "various aspects" etc., indicate that the aspect(s) and/or aspects so described may include a particular feature, structure, or characteristic, but not every aspect or aspect necessarily includes the particular feature, structure, or characteristic. Further, repeated use of the phrase "in one aspect" or "in one aspect" does not necessarily refer to the same aspect or aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in *SAE J3016 2018: Taxonomy and definitions for terms related to driving automation systems for on road motor vehicles*, or by other relevant professional organizations. The SAE level may have a value ranging from a minimum level, e.g., level 0 (illustratively, substantially no driving automation), to a maximum level, e.g., level 5 (illustratively, full driving automation).

An "assisted vehicle" may describe a vehicle capable of informing a driver or occupant of the vehicle of sensed data or information derived therefrom.

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHz, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra-Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, an assisted vehicle system, a driver assistance and/or support system, and/or the like.

For example, radar device 101 may be installed in vehicle 101 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below. In one example, radar device 101 may be mounted onto, placed, e.g., directly, onto, or attached to, vehicle 100.

In some demonstrative aspects, vehicle 100 may include a single radar device 101. In other aspects, vehicle 100 may include a plurality of radar devices 101, for example, at a plurality of locations, e.g., around vehicle 100.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
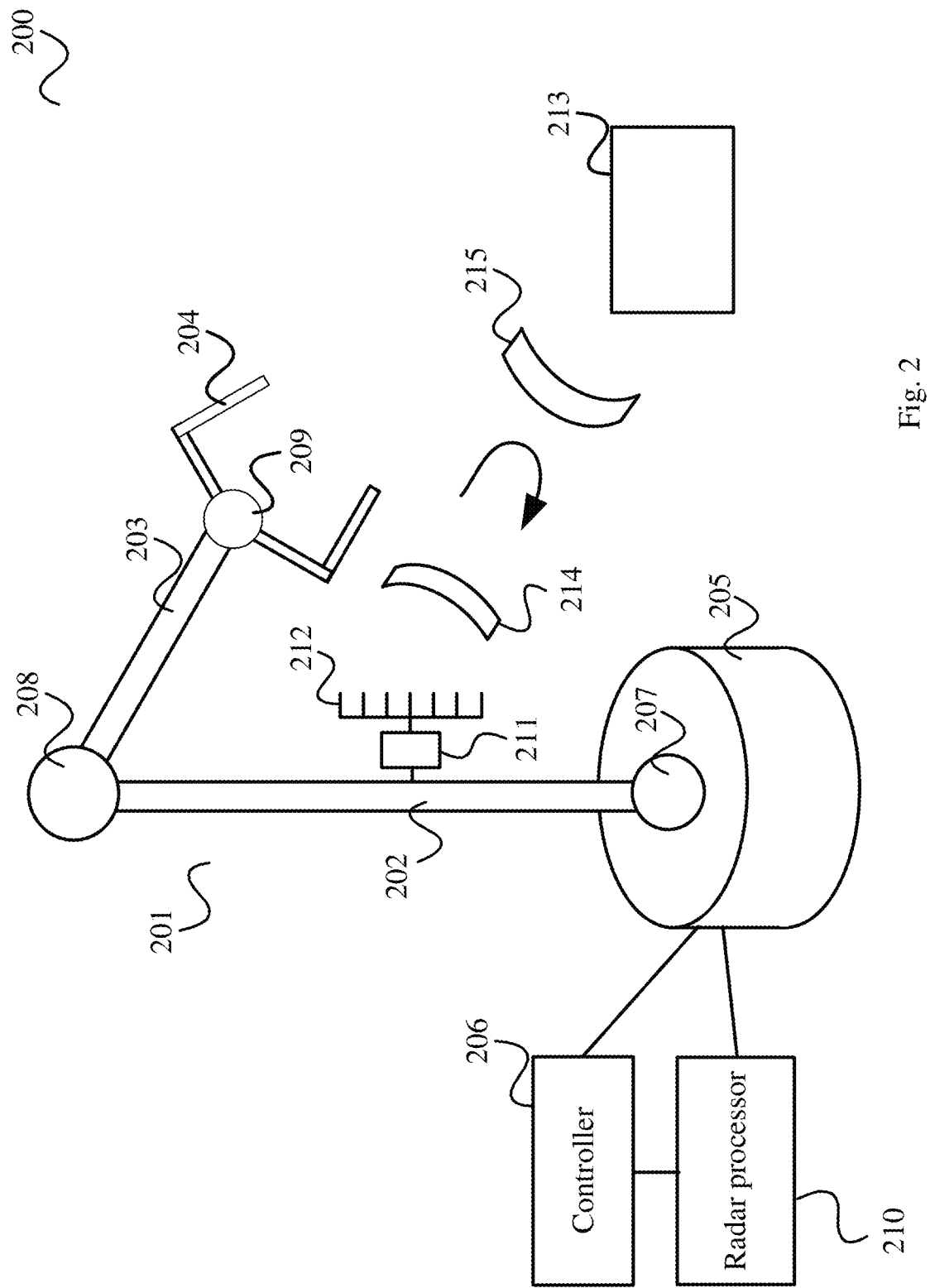
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
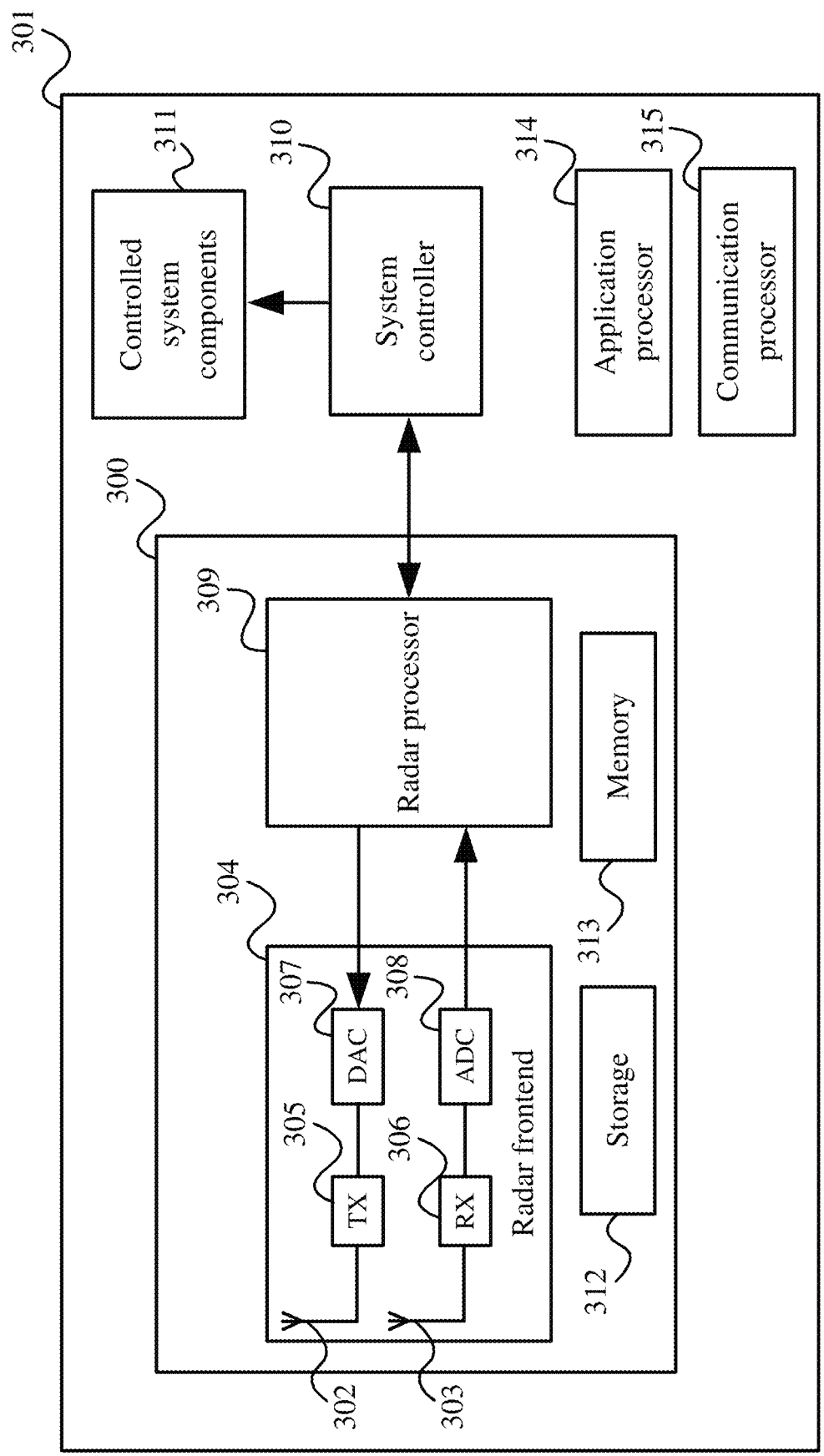
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital Converter (ADC) 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
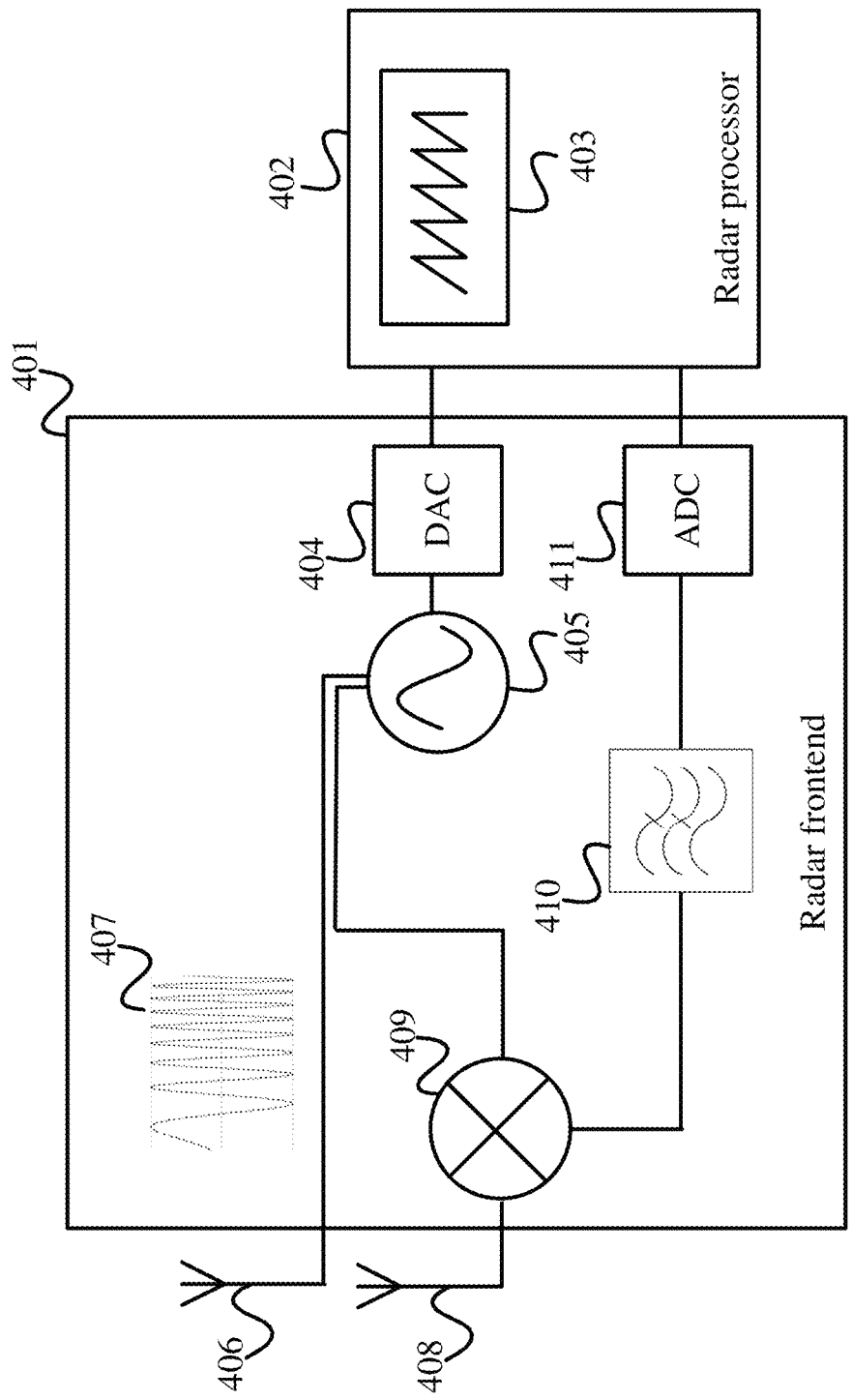
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
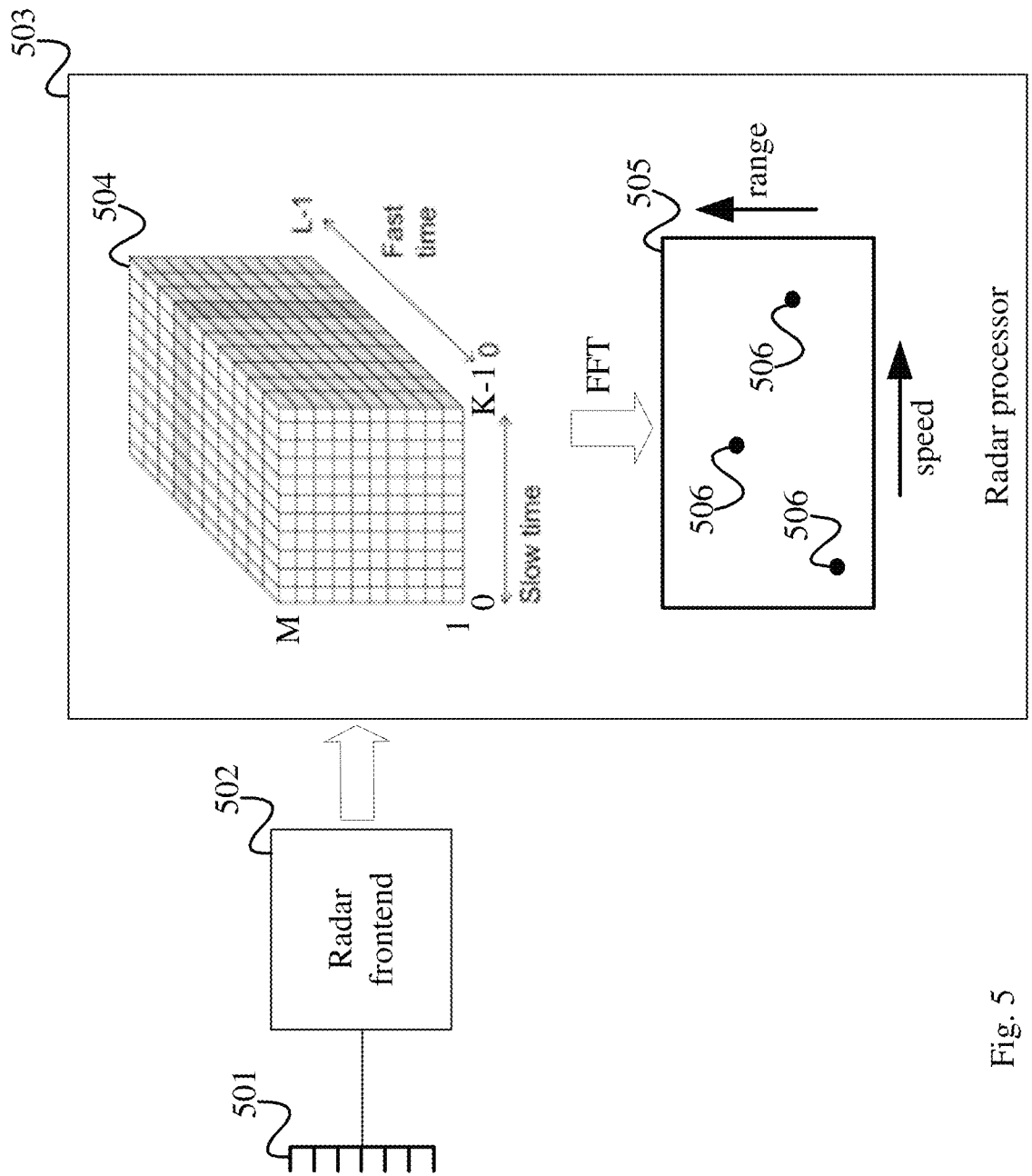
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 105 (FIG. 1)

and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
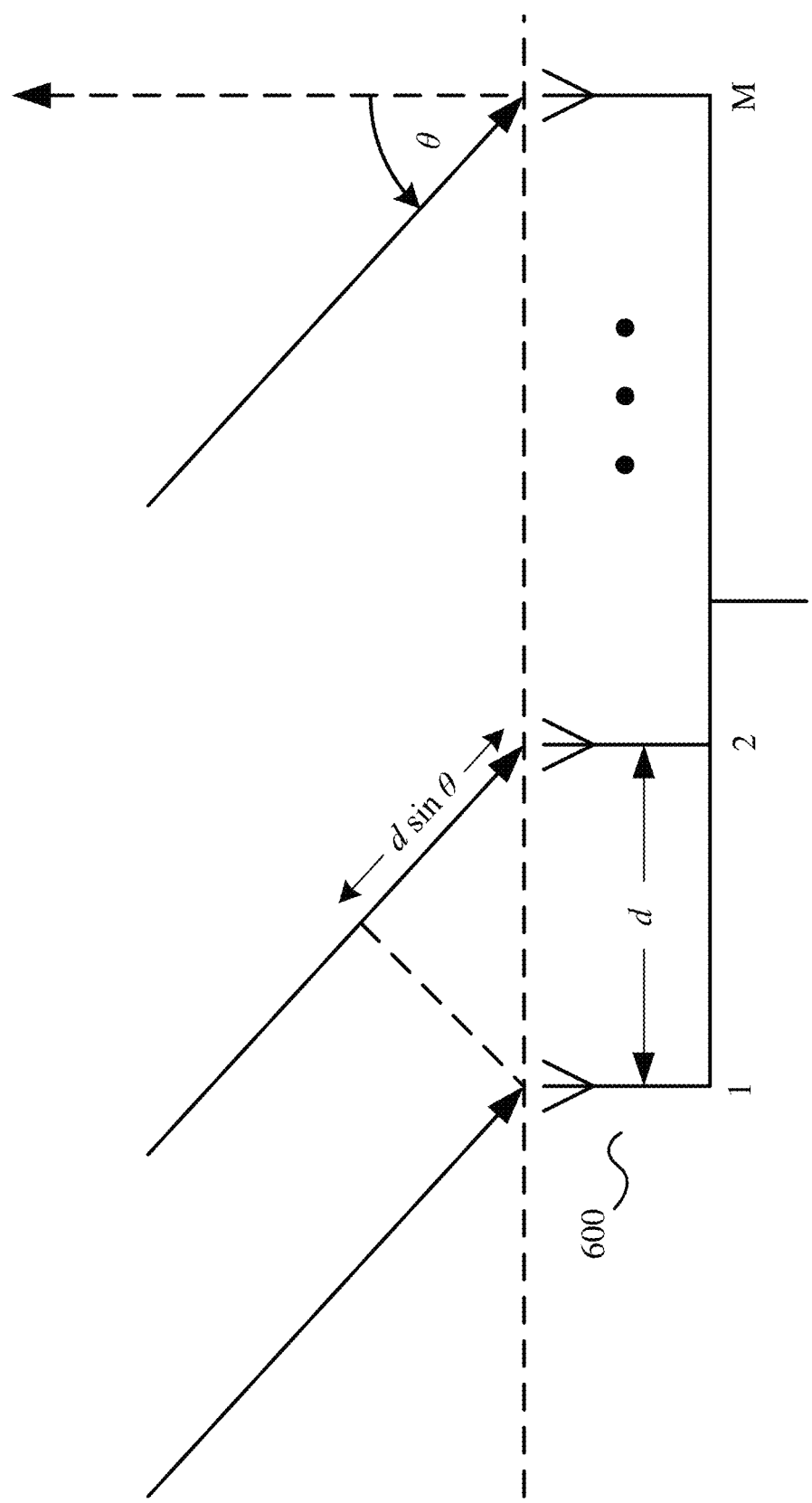
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted $\Delta\varphi$, between two antennas of the receive antenna array 601 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and $\theta$ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
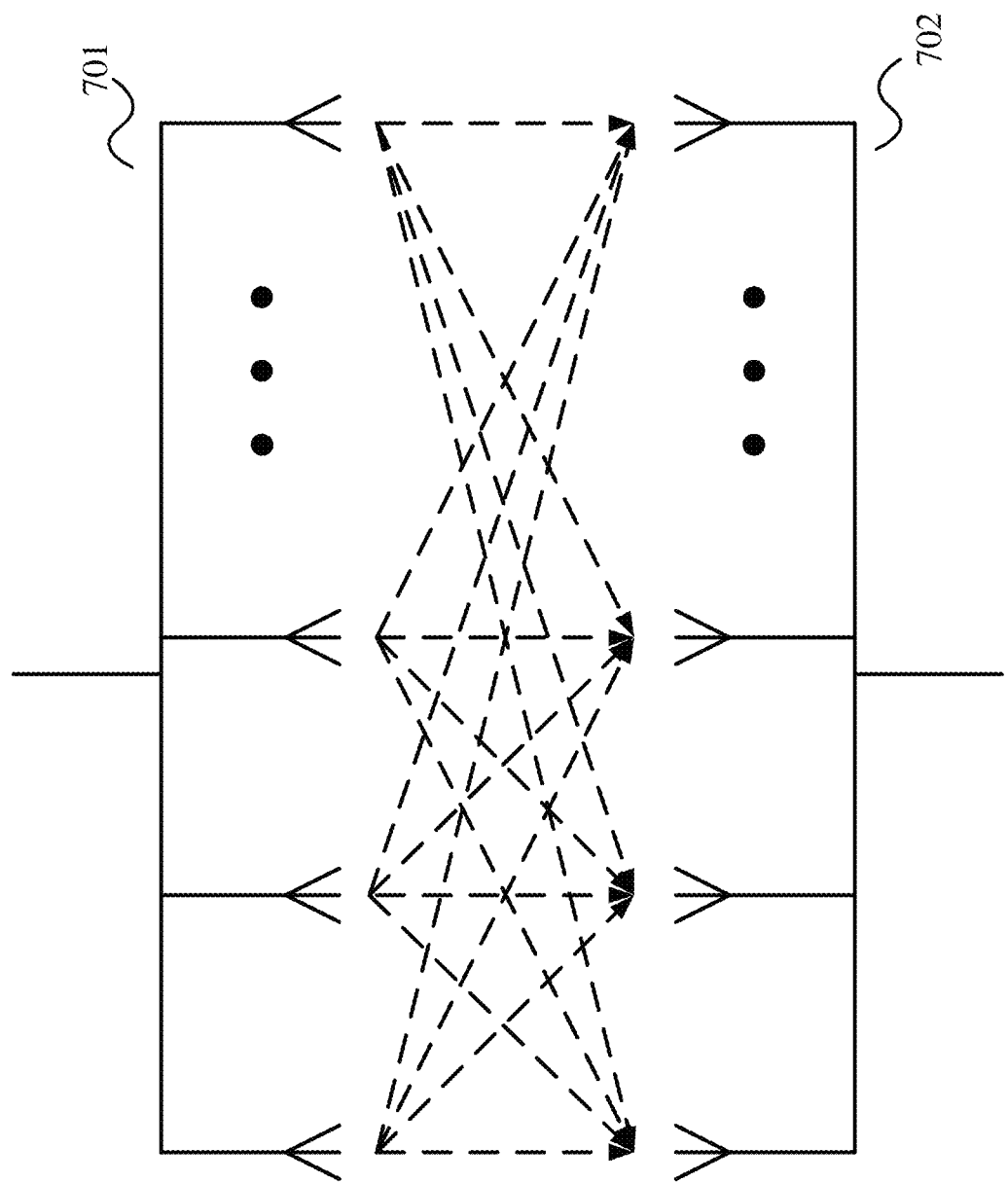
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
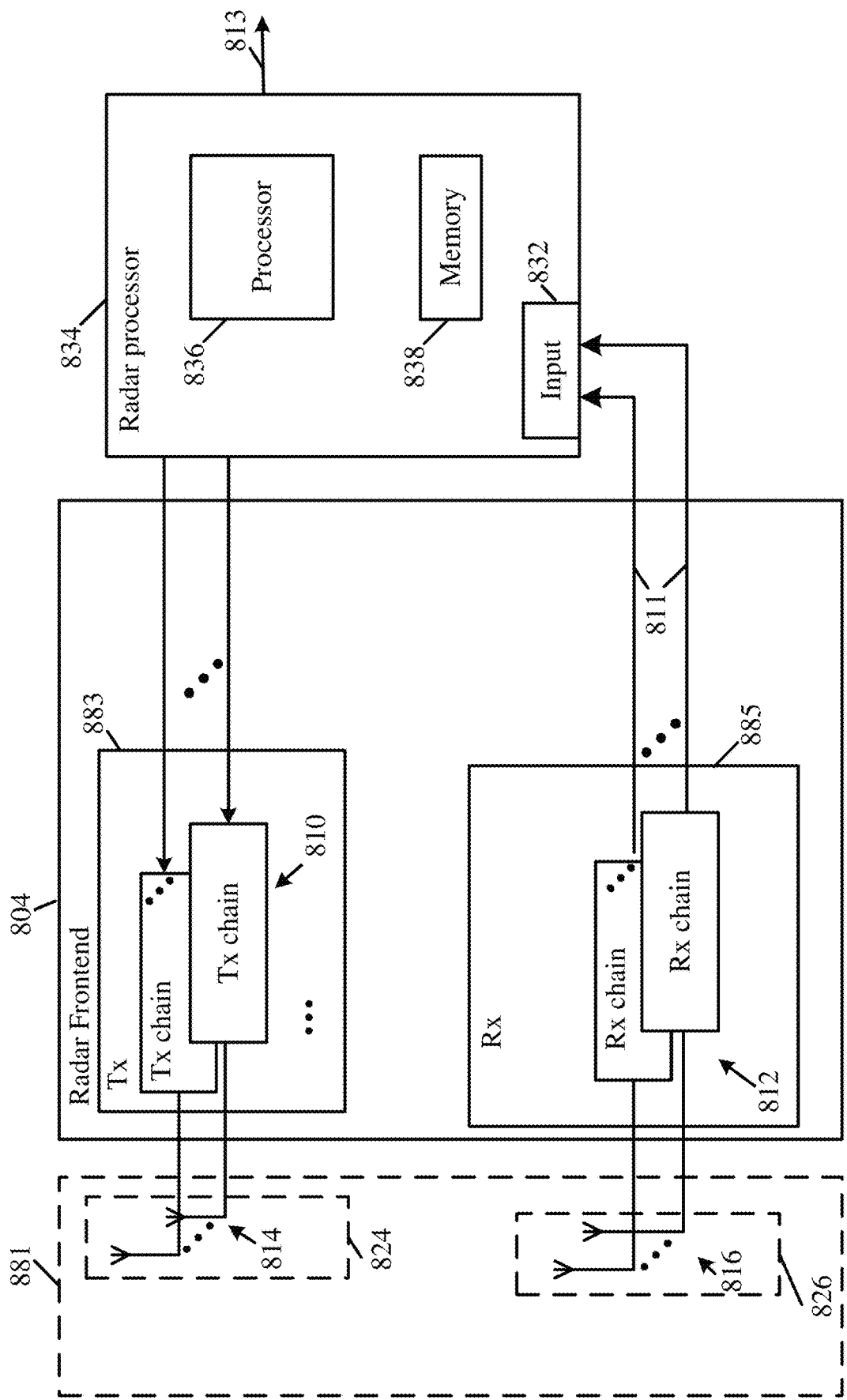
FIG. 8 is a schematic block diagram illustration of a radar frontend and a radar processor, in accordance with some demonstrative aspects.

FIG. 8 is a schematic block diagram illustration of a radar frontend 804 and a radar processor 834, in accordance with some demonstrative aspects. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 2), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on radar Rx data 811 received from the plurality of Rx chains 812. For example, radar Rx data 811 may be based on the radar Rx signals received via the Rx antennas 816.

In some demonstrative aspects, radar processor 834 may include an input 832 to receive radar input data, e.g., including the radar Rx data 811 from the plurality of Rx chains 812.

In some demonstrative aspects, radar processor 834 may include, or may be implemented, partially or entirely, by circuitry and/or logic, e.g., one or more processors including circuitry and/or logic, memory circuitry and/or logic. Additionally or alternatively, one or more functionalities of radar processor 834 may be implemented by logic, which may be executed by a machine and/or one or more processors, e.g., as described below.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data, e.g., as described below. In one example, the range information and/or Doppler information may be determined based on a Cross-Correlation (XCORR) operation, which may be applied to the radar Rx data. Any other additional or alternative operation, algorithm and/or procedure may be utilized to generate the range information and/or Doppler information.

In some demonstrative aspects, memory 838 may be configured to store AoA information, which maybe generated by processor 836, for example, based on the radar Rx data, the range information and/or Doppler information, e.g., as described below. In one example, the AoA information may be determined based on an AoA estimation algorithm. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information, e.g., as described below.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via one or more Tx arrays 824 including a plurality of N elements, e.g., Tx antennas 814, and processing received signals via one or more Rx arrays 826 including a plurality of M elements, e.g., Rx antennas 816.

In some demonstrative aspects, utilizing the MIMO technique of transmission of the orthogonal signals from the Tx arrays 824 with N elements and processing the received signals in the Rx arrays 826 with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, a wideband antenna, e.g., MIMO antenna array 881, may be configured for communication of radar signals over a wide frequency band. For example, the wideband antenna may support improved range resolution and/or improved interference mitigation, e.g., compared to narrowband antennas.

In some demonstrative aspects, there may be a need to provide a technical solution to support proper operation of a wideband antenna, e.g., MIMO antenna array 881, for example, in various environmental conditions, for example, weather conditions, e.g., as described below.

In some demonstrative aspects, a radar antenna, e.g., MIMO antenna array 881, may be covered by a radome, which may be configured to protect the radar antenna, for example, in one or more scenarios and/or use cases, for example, in various whether conditions, e.g., as descried below.

In some demonstrative aspects, the radome may be configured, for example, to protect a front surface of the radar antenna, for example, from rain, snow, hail, icing, humidity, fog, dust, and/or any other additional or alternative weather condition and/or environmental condition.

In some demonstrative aspects, the radome may have de-icing capabilities and/or may be equipped with a deicer, which may be configured to prevent accumulation of one or more substances on the radome, for example, to enable proper and/or safe performance of a radar frontend, e.g., radar frontend 804.

In some demonstrative aspects, the deicer may be configured to remove, defrost, and/or de-ice one or more substances, for example, precipitation substances, e.g., snow, ice, rain, hail, or the like, from the radome, for example, to avoid an antenna performance degradation in various weather conditions, e.g., snow and/or rain.

In some demonstrative aspects, the deicer may be configured to remove, defrost, and/or de-ice one or more substances on the radome, for example, by heating one or more parts of the radome, e.g., as described below.

In some demonstrative aspects, there may be a need to address one or more technical issues, for example, when implementing a radar antenna and a radome with de-icing capabilities, e.g., as described below.

Figure 9:
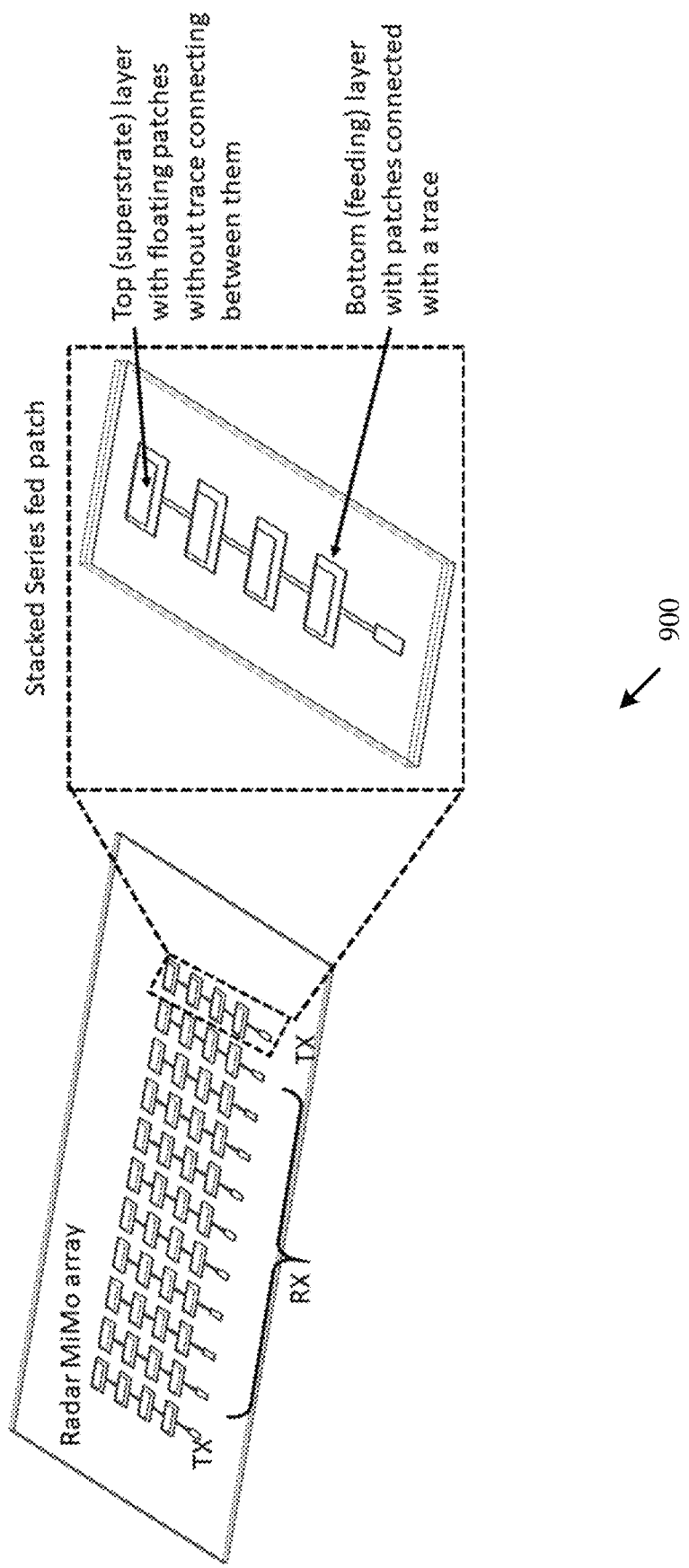
FIG. 9 is a schematic illustration of a stack series fed antenna, to demonstrate a technical problem, which may be addressed in accordance with some demonstrative aspects.

Reference is made to FIG. 9, which schematically illustrates a stack series fed antenna 900, to demonstrate a technical problem, which may be addressed in accordance with some demonstrative aspects.

In one example, stack series fed antenna 900 may be configured to enhance a bandwidth of a single-layer narrowband antenna, for example, by using a two-layer stacked patch antenna, e.g., as described below.

As shown in FIG. 9, stack series fed antenna 900 may include a plurality of two-layer stacked patch antennas.

As shown in FIG. 9, a two-layer stacked patch antenna may include two antenna patches stacked one over the other. For example, the two antenna patches may be viewed as two resonators, which may be configured to combine their two resonances into a single wideband resonance, for example, as a result of an electromagnetic coupling between the two antenna patches.

As shown in FIG. 9, stack series fed antenna 900 may include a first layer (bottom layer) and a second layer (top layer).

As shown in FIG. 9, the first layer may include a series fed antenna including several antenna patches which are connected via a connecting trace.

As shown in FIG. 9, the second layer may include floating patches without a connecting trace. For example, as shown in FIG. 9, the floating patches of the second layer may be located above respective antenna patches of the first layer.

As shown in FIG. 9, stack series fed antenna 900 may include a stacked configuration for the series fed antenna, for example, where the second layer is above the first layer. For example, the stacked configuration may be useful, for example, to increase a gain of the first layer, for example, for systems, in which a high gain is required, for example, in automotive radar arrays operating in a mmWave range.

In some demonstrative aspects, in some use cases and/or implementations there may be one or more disadvantages, inefficiencies, and/or technical problems in an antenna structure, e.g., stack series fed antenna 900, including a first layer including series-fed antenna with antenna patches connected with a connecting trace, and a second layer, e.g., a superstrate layer, including floating patches without a connecting trace, e.g., as described below.

In one example, implementation of the floating patches without the connecting trace may be suitable for stacked antennas including two relatively thin layers. However, a radome for a wideband antenna operating at a mmWave range may become thick compared to a wavelength of radar signals at the mmWave range. Accordingly, this implementation may result in a sub-optimal bandwidth broadening.

In another example, implementation of the floating patches without the connecting trace may not allow using the second layer as part of a deicer, for example, as it may not be possible to form a single Direct Current (DC) conductive structure in the second layer.

In another example, the series-fed stacked patch antenna 900 may be optimized, for example, by tuning dimensions of the patches in both the first layer and the second layer. Accordingly, when removing the second layer, the series fed antenna in the first layer may be completely un-matched, e.g., even in a narrower band. Accordingly, the series-fed stacked patch antenna 900 may not be suitable for modular implementation.

Figure 10:
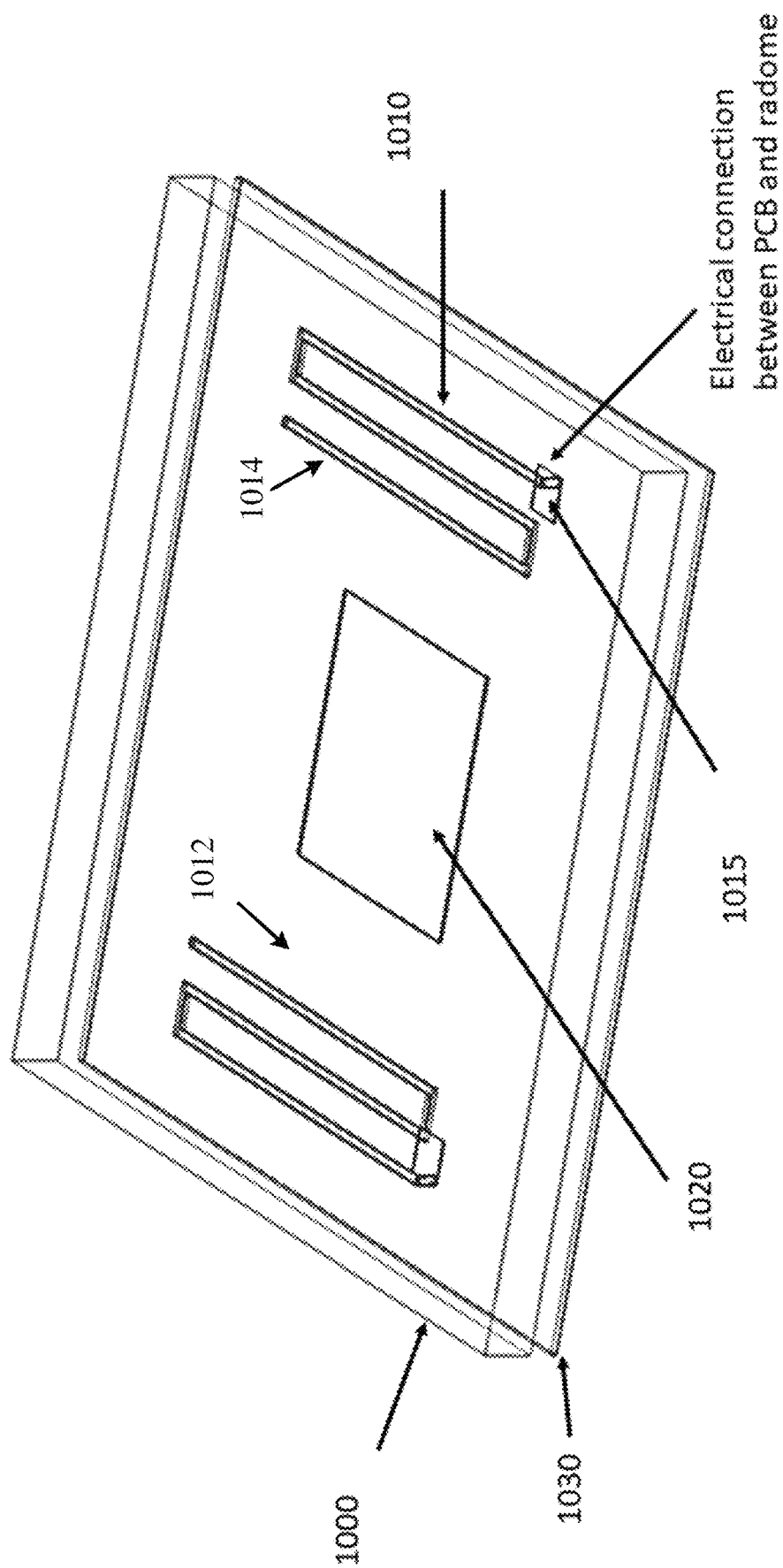
FIG. 10 is a schematic illustration of a radome including de-icing structures, to demonstrate a technical problem, which may be addressed in accordance with some demonstrative aspects.

Reference is made to FIG. 10, which schematically illustrates a radome 1000 including de-icing structures 1010, to demonstrate a technical problem, which may be addressed in accordance with some demonstrative aspects.

As shown in FIG. 10, radome 1000 may be configured to cover a radar antenna 1020, which may be on a printed circuit board (PCB) 1030.

As shown in FIG. 10, de-icing structures 1010 may include a first de-icing structure 1012 on a first side of radar antenna 1020, and/or a second de-icing structure 1014 on a second side of radar antenna 1020.

In one example, radar antenna 1020 may be required to operate, for example, even under bad weather conditions, e.g., such as snow and/or rain. For example, in these weather conditions, humidity, water, snow, and/or ice may accumulate on radome 1000, which may attenuate radar signals of radar antenna 1020.

For example, de-icing structures 1010 may be heated to a temperature which may be suitable to melt and/or remove humidity, water, snow, and/or ice from the radome 1000.

As shown in FIG. 10, de-icing structures 1010 may be based on metal strips, which may be spread along the radome 1000.

As shown in FIG. 10, de-icing structures 1010 may be connected to one or more DC power sources 1015 on PCB 1030.

In one example, de-icing structures 1010 may be heated to remove the ice and/or humidity from the radome 1000, for example, by conducting electric current, e.g., a DC current from DC power sources 1015 through the metal strips.

In some demonstrative aspects, in some use cases and/or implementations there may be one or more disadvantages, inefficiencies, and/or technical problems in an implantation of a deicing a radome, e.g., radome 1000, using de-icing structures including metal strips, e.g., de-icing structures 1010, spread along the radome, to heat the radome.

For example, it may not be possible to implement the metal strips 1010 to cover an area of the antenna 1020, for example, since the metal strips may cause surface currents effects, for example, which may distort radar Tx signals transmitted from the radar antenna 1020 and/or radar Rx signals received by the radar antenna 1020.

For example, implementing the metal strips 1010 over the radar antenna 1020 may result in wave surface distortion, which may have an impact on performance accuracy of radar antenna 1020. For example, it may be difficult to mitigate the wave surface distortion, for example, as correction factors to mitigate this distortion may not be constant, e.g., may vary with aging.

For example, there may be a need to maintain a keep-out distance between the metal strips 1010 and the antennas 1020. For example, de-icing structures 1012 and/or 1014 may be located on both sides of radar antenna 1020 at a keep-out distance from radar antenna 1020.

For example, an area of radome 1000 above radar antenna 1020 may not be efficiently heated, and/or high power consumption may be required to achieve an efficient deicing of the area above radar antenna 1020, for example, due to the keep-out distance maintained between metal strips 1010 and the radar antenna 1020, and/or as a result of a low thermal conductivity of radome materials of radome 1000.

In some demonstrative aspects, in some use cases and/or implementations there may be one or more disadvantages, inefficiencies, and/or technical problems in an implantation for deicing a radome, e.g., radome 1000, using de-icing structures, e.g., de-icing structures 1010 including resistive polymeric layers, e.g., as described below.

In one example, a keep-out distance between the radar antenna 1020 and de-icing structures 1010 may be reduced, for example, when using the resistive polymeric layers, e.g., compared to the keep-out distance when using metal strips. However, the resistive polymeric layers may still not be located directly above the radar antenna 1020, for example, in order to avoid a signal loss, e.g., due to an electromagnetic absorption in a lossy layer of the resistive polymeric layers. Accordingly, the area of radome 1000 above radar antenna 1020 may not be efficiently heated, e.g., even when using the resistive polymeric layers.

In some demonstrative aspects, a stack series fed antenna may be configured to include an antenna layer on a surface of a radome, e.g., as described below.

In some demonstrative aspects, the stack series fed antenna including the antenna layer on the surface of the radome may provide a technical solution to achieve efficient wide-band operation, e.g., as described below.

In some demonstrative aspects, the stack series fed antenna including the antenna layer on the surface of the radome may provide a technical solution to provide an efficient de-icing of the radome, for example, even without degrading the performance of the wide-band operation, e.g., as described below.

Figure 11:
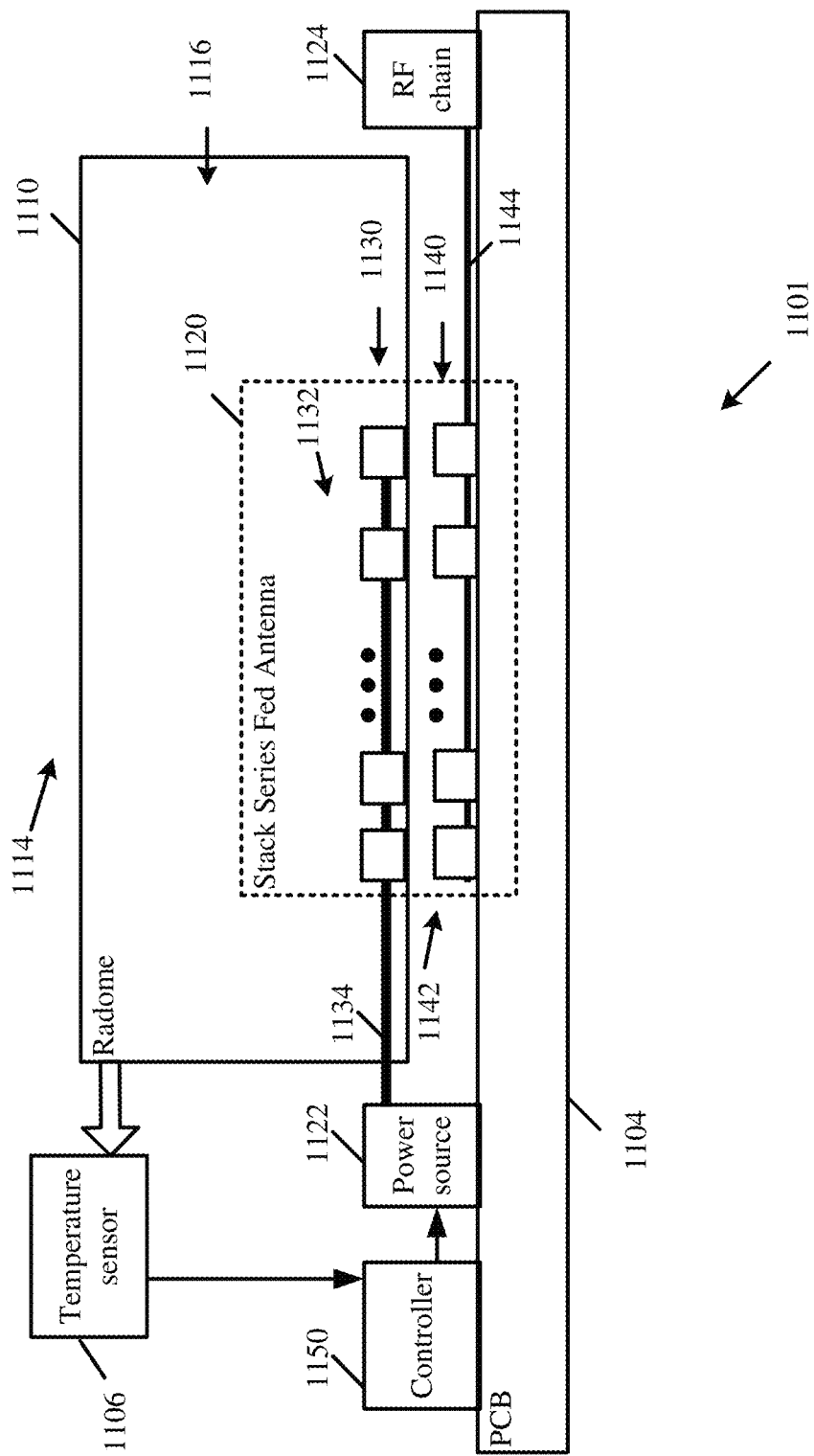
FIG. 11 is a schematic illustration of an apparatus including a radome and a stack series fed antenna, in accordance with some demonstrative aspects.

Reference is made to FIG. 11, which schematically illustrates an apparatus 1101 including a radome 1110 and a stack series fed antenna 1120, in accordance with some demonstrative aspects. For example, apparatus 1101 may include one or more elements of radar front-end 804 (FIG. 8), and/or may perform one or more operations and/or functionalities of radar front-end 804 (FIG. 8). For example, MIMO radar antenna 881 (FIG. 8) may include one or more elements of stack series fed antenna 1120, and/or may perform one or more operations and/or functionalities of stack series fed antenna 1120.

In some demonstrative aspects, radome 1110 may be configured to protect stack series fed antenna 1120, for example, in various environmental conditions, e.g., weather conditions, as described below.

In some demonstrative aspects, the radome 1110 may be configured to protect stack series fed antenna 1120, for example, from rain, snow, hail, icing, humidity, fog, dust, and/or any other additional or alternative weather conditions and/or environmental conditions.

In some demonstrative aspects, apparatus 1101 may be configured to protect and/or enhance operation of stack series fed antenna 1120, for example, by implementing a de-icing mechanism, which may support defrosting and/or deicing the radome 1110, for example, even without substantially interfering with operation of stack series fed antenna 1120, e.g., as described below.

In some demonstrative aspects, as shown in FIG. 11, stack series fed antenna 1120 may include a plurality of antenna layers, e.g., as described below.

In some demonstrative aspects, as shown in FIG. 11, the plurality of antenna layers may include a first antenna layer 1130 and a second antenna layer 1140, e.g., as described below.

Some demonstrative aspects are described herein with respect to a stack series fed antenna including two antenna layers, e.g., stack series fed antenna 1120. In other aspects, the stack series fed antenna may be implemented using any other count of antenna layers, e.g., three antenna layers, or even more than three antenna layers.

In some demonstrative aspects, first antenna layer 1130 may be between radome 1110 and the second antenna layer 1140, e.g., as described below.

In some demonstrative aspects, first antenna layer 1130 may be under radome 1110, e.g., covered by radome 1110, and the second antenna layer 1140 may be under the first antenna layer 1130, e.g., as described below.

In some demonstrative aspects, as shown in FIG. 11, the first antenna layer 1130 may be on an inner surface of radome 1110, e.g., as described below.

In some demonstrative aspects, as shown in FIG. 11, the first antenna layer 1130 may include a first plurality of serially connected antenna elements 1132, e.g., as described below.

In some demonstrative aspects, as shown in FIG. 11, the first antenna layer 1130 may include a first trace 1134 configured to drive an electrical current from a power source 1122 to the first plurality of serially connected antenna elements 1132, e.g., as described below.

In one example, power source 1122 may include a DC power source, or any other power source, e.g., an Alternating Current (AC) power source.

In some demonstrative aspects, as shown in FIG. 11, the second antenna layer 1140 may be covered by the inner surface of the radome 1110, e.g., as described below.

In some demonstrative aspects, as shown in FIG. 11, the second antenna layer 1140 may include a second plurality of serially connected antenna elements 1142, e.g., as described below.

In some demonstrative aspects, as shown in FIG. 11, the second antenna layer 1140 may include a second trace 1144 configured to serially connect the second plurality of serially connected antenna elements 1142 to an RF chain 1124, e.g., as described below. For example, RF chain 1124 may include one or more elements of an RF chain of the plurality of Tx chains 810 (FIG. 8) and the plurality of Rx chains 812 (FIG. 8), and/or may perform one or more operations and/or functionalities of an RF chain of the plurality of Tx chains 810 (FIG. 8) and the plurality of Rx chains 812 (FIG. 8).

In some demonstrative aspects, as shown in FIG. 11, apparatus 1101 may include a PCB 1104, e.g., as described below.

In some demonstrative aspects, as shown in FIG. 11, the second antenna layer 1140 may be on the PCB 1104, e.g., as described below.

In some demonstrative aspects, the first antenna layer 1130 may be configured to heat the radome 1110, for example, when the first plurality of serially connected antenna elements 1132 is subject to the electrical current from power source 1122, e.g., as described below.

In some demonstrative aspects, as shown in FIG. 11, the first antenna layer 1130 may be configured to heat a region 1114 of the radome 1110, for example, when the first plurality of serially connected antenna elements 1132 is subject to the electrical current from power source 1122, e.g., as described below.

In some demonstrative aspects, as shown in FIG. 11, the region 1114 of the radome 1110, which may be heated by the first antenna layer 1130, may be above the stack series fed antenna 1120, e.g., above the first plurality of serially connected antenna elements 1132 and the second plurality of serially connected antenna elements 1142, e.g., as described below.

Some demonstrative aspects are described herein with respect to an implementation of a first antenna layer of a stack series fed antenna, e.g., the first antenna layer 1130 of stack series fed antenna 1120, on an inner surface of a radome, e.g., the inner surface of radome 1110.

In other aspects, the first antenna layer of the stack series fed antenna may be implemented separately from the radome. For example, the first antenna layer 1130 may be part of a layer of the PCB 1104, may be implemented in a separate PCB or flexible PCB, or may be fixed onto, laminated into, or integrated into the radome 1110, e.g. to improve de-icing performance by implementing the first antenna layer 1130 close to the radome.

For example, the first antenna layer of the stack series fed antenna may be implemented on a layer, which may be connected to the radome, e.g., directly or indirectly.

In one example, the first antenna layer of the stack series fed antenna may be laminated onto the inner surface of the radome.

In another example, the first antenna layer of the stack series fed antenna may be implemented on a flexible PCB, which may be connected to the radome. For example, the first antenna layer of the stack series fed antenna may be implemented on a flexible PCB, which may be roughly conformal to a shape of the radome.

In some demonstrative aspects, the first antenna layer of the stack series fed antenna may be directly in contact with the radome, e.g., with the inner surface of the radome and/or any other surface of the radome.

In other aspects, there may be a gap between the first antenna layer of the stack series fed antenna and the radome.

In one example, the first antenna layer of the stack series fed antenna may be separated from the radome by a gap, e.g., an air gap, and/or a gap of any other substance or material, e.g., an adhesive and/or a resin. For example, the size of the gap and/or the substance in the gap may be configured as to provide sufficient heat from the first antenna layer of the stack series fed antenna to heat the radome.

In some demonstrative aspects, as shown in FIG. 11, the first plurality of serially connected antenna elements 1132 may be aligned with the second plurality of serially connected antenna elements 1142, e.g., as described below.

In other aspects, one or more of the first plurality of serially connected antenna elements 1132 may not be aligned with one or more respective elements of the second plurality of serially connected antenna elements 1142.

In one example, the second plurality of serially connected antenna elements 1142 may be on a generally planar surface, e.g., on a surface of the PCB 1104, and/or the first plurality of serially connected antenna elements 1132 may be on a different geometric surface, e.g., a planar surface or a non-planar surface. For example, the first plurality of serially connected antenna elements 1132 may be on a surface, which may have a shape conformal to a surface of the radome 1110.

In some demonstrative aspects, the first plurality of serially connected antenna elements 1132 and the second plurality of serially connected antenna elements 1142 may be electromagnetically coupled, e.g., as described below.

In some demonstrative aspects, as shown in FIG. 11, a count of the first plurality of serially connected antenna elements 1132 may be equal to a count of the second plurality of serially connected antenna elements 1142, e.g., as described below.

In some demonstrative aspects, as shown in FIG. 11, an arrangement of the first plurality of serially connected antenna elements 1132 in the first antenna layer 1130 may be identical to an arrangement of the second plurality of serially connected antenna elements 1142 in the second antenna layer 1140, e.g., as described below.

In some demonstrative aspects, the first plurality of serially connected antenna elements 1132 may include a plurality of printed antenna elements printed on the inner-side of the radome 1110, e.g., as described below.

In some demonstrative aspects, the radome 1110 may include a dielectric layer 1116, e.g., as described below.

In some demonstrative aspects, as shown in FIG. 11, the first antenna layer 1130 may be on the dielectric layer 1116, which may be formed of a suitable dielectric material, e.g., as described below.

In some demonstrative aspects, as shown in FIG. 11, the first antenna layer 1130 may be between the dielectric layer 1116 and the second antenna layer 1140, e.g., as described below.

In some demonstrative aspects, stack series fed antenna 1120 may be configured for communication in a first frequency bandwidth, while second antenna layer 1140 may be configured for communication in a second frequency bandwidth, which may be narrower than, and included within, the first frequency bandwidth, e.g., as described below.

In some demonstrative aspects, stack series fed antenna 1120 may be configured for wide-band communication, for example, in a frequency bandwidth between 76 GHz and 81 GHz, e.g., as described below.

In other aspects, stack series fed antenna 1120 may be configured for communication in any other range of frequencies.

In some demonstrative aspects, second antenna layer 1140 may be configured for narrow-band communication in a frequency bandwidth between 76 GHz and 77 GHz, e.g., as described below.

In other aspects, second antenna layer 1140 may be configured for communication in any other range of frequencies.

In some demonstrative aspects, as shown in FIG. 11, apparatus 1101 may include a temperature sensor 1106 configured to sense a temperature of the radome 1110, e.g., as described below.

In some demonstrative aspects, as shown in FIG. 11, apparatus 1101 may include a controller 1150 configured to control the electrical current to be provided to the first plurality of serially connected antenna elements 1132, for example, based on the temperature of the radome 1110, for example, as indicated by temperature sensor 1106, e.g., as described below. For example, processor 836 (FIG. 8) may include one or more elements of radar controller 1150, and/or may perform one or more operations and/or functionalities of radar controller 1150.

In some demonstrative aspects, stack series fed antenna 1120 may include a stack series fed antenna array, e.g., as described below. For example, MIMO radar antenna 881 (FIG. 8) may include one or more elements of the stack series fed antenna array 1120, and/or may perform one or more operations and/or functionalities of stack series fed antenna array 1120.

In some demonstrative aspects, the first antenna layer 1130 may include a first plurality of antenna sub-arrays, e.g., as described below.

In some demonstrative aspects, an antenna sub-array of the first plurality of antenna sub-arrays may include the first plurality of serially connected antenna elements 1132, e.g., as described below.

In some demonstrative aspects, the first trace 1134 may be configured to drive the electrical current to the first plurality of antenna sub-arrays, e.g., as described below.

In some demonstrative aspects, the second antenna layer 1140 may include a second plurality of antenna sub-arrays, e.g., as described below.

In some demonstrative aspects, an antenna sub-array of the second plurality of antenna sub-arrays may include the second plurality of serially connected antenna elements 1142, e.g., as described below.

In some demonstrative aspects, the second antenna layer 1140 may include a plurality of second traces 1144 configured to connect the second plurality of antenna sub-arrays to a respective plurality of RF chains 1124.

In some demonstrative aspects, the stack series fed antenna array 1120 may include a MIMO antenna array including one or more Tx antenna arrays and one or more Rx antenna arrays. For example, the stack series fed antenna array 1120 may include the Tx arrays 824 (FIG. 8), and/or the Rx arrays 826 (FIG. 8).

In one example, the second antenna layer 1140 may include a plurality of Tx antenna subarrays, e.g., including Tx arrays 824 (FIG. 8), and a plurality of Rx antenna subarrays, e.g., including Rx arrays 826 (FIG. 8). For example, the second antenna layer 1140 may include a first plurality of traces 1144, which may connect the Tx arrays 824 (FIG. 8) to the RF Tx chains 810 (FIG. 8), and/or a second plurality of traces 1144, which may connect the Rx arrays 824 (FIG. 8) to the RF Rx chains 812 (FIG. 8).

In some demonstrative aspects, processor 836 (FIG. 8) may be configured to control communication of radar signals via the stack series fed antenna array 1120, and to generate radar information 813 (FIG. 8), for example, based on the radar signals.

In some demonstrative aspects, an implementation utilizing the plurality of printed antenna elements of the first antenna layer 1130, which may be printed on the inner-side of the radome 1110, may provide one or more technical advantages, e.g., as described below.

In one example, the first layer 1030 may be operated as part of a deicer of radome 1110, for example, with respect to an area of radome 1110, which may be located directly above the second layer 1040 of stack series fed antenna array 1120. For example, the first antenna layer 1130 may be heated, for example, to heat the area 1114, which may be located directly above the second layer 1040 of stack series fed antenna array 1120. This ability to heat the area 1114, which may be located directly above the stack series fed antenna array 1120 may provide a technical solution with improved deicing efficiency of radome 1000 in the area directly above the stack series fed antenna array 1120.

In another example, the plurality of serially connected antenna elements 1132 of the first antenna layer 1130 may be electromagnetically coupled to the second plurality of serially connected antenna elements 1142 on the PCB 1104. According to this example, wideband operation of the stack series fed antenna array 1120 may be attained, for example, even when a thick radome 1110 is used. This technical solution may provide improved wideband capabilities, for example, compared to the stack series fed antenna 900 (FIG. 9), which may not be suitable for wideband operation. e/g/. in case a think radome is used.

In some demonstrative aspects, as shown in FIG. 11, stack series fed antenna 1120 may include a unique series-fed stacked antenna structure, in which antenna elements, e.g., the first plurality of serially connected antenna elements 1132, may be connected with a trace, e.g., trace 1134, and may be printed on the inner side of the radome 1110.

In some demonstrative aspects, as shown in FIG. 11, the antenna elements 1132 may be connected to power source 1122, for example, such that the first antenna layer 1030 may be operable as a deicer.

In some demonstrative aspects, as shown in FIG. 11, the first plurality of serially connected antenna elements 1132 may be operated to efficiently heat the antenna region 1114 directly above stack series fed antenna 1120, for example, without needing to maintain a keep-out distance between the heating elements of the deicer and the area 1114.

In some demonstrative aspects, stack series fed antenna 1120 may be configured for communication over a wide frequency bandwidth, for example, even when implementing a thick radome 1110.

In some demonstrative aspects, the antenna elements 1142 on the antenna layer 1140 of stack series fed antenna 1120 may remain operable for communication over part of the bandwidth of stack series fed antenna 1120, e.g., over a narrow frequency band, for example, in case the printed antenna elements 1132 on the radome 1110 are removed, or when radome 1110 is removed.

In some demonstrative aspects, stack series fed antenna 1120 may be implemented to provide a technical solution which may allow to use a simple, low-cost, highly reliable, and/or thin PCB antenna, e.g., for implementing the antenna elements 1142 of second antenna layer 1040, for example, while adding printed antenna elements on the radome 1110, e.g., to form the antenna elements 1132 of the first antenna layer 1030.

In some demonstrative aspects, the serially connected antenna elements 1132 may serve and/or may be operated as, part of a deicer, which may allow a highly efficient and low power consumption operation to remove ice, snow and/or the like, from areas 1114 of radome 1110 above the antenna area of stack series fed antenna 1120.

In some demonstrative aspects, apparatus 1101 may be implemented to provide a technical solution with low cost and/or high-performance, for example, for wideband radar antennas, e.g., for automotive radar systems, which may be operable, for example, even in bad weather conditions.

Figure 12:
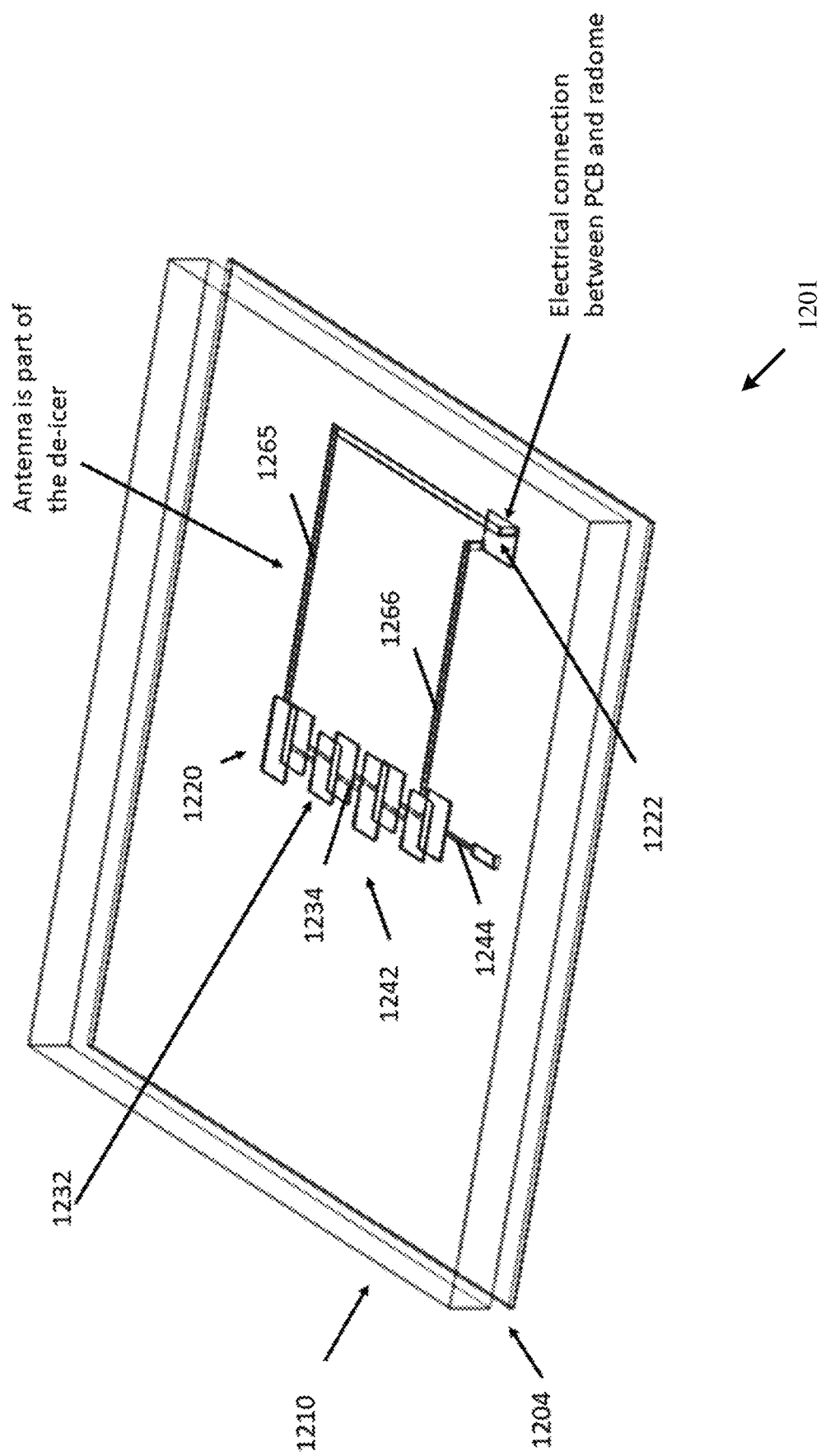
FIG. 12 is a schematic illustration of an isometric view of an apparatus including a radome and a stack series fed antenna, in accordance with some demonstrative aspects.

Reference is made to FIG. 12, which schematically illustrates an isometric view of an apparatus 1201 including a radome 1210 and a stack series fed antenna 1220, in accordance with some demonstrative aspects. For example, apparatus 1201 may include one or more elements of radar front-end 804 (FIG. 8), and/or may perform one or more operations and/or functionalities of radar front-end 804 (FIG. 8). For example, MIMO radar antenna 881 (FIG. 8) may include one or more elements of stack series fed antenna 1220, and/or may perform one or more operations and/or functionalities of stack series fed antenna 1220.

In some demonstrative aspects, radome 1210 may be configured to protect stack series fed antenna 1220, for example, in various environmental conditions, e.g., weather conditions.

In some demonstrative aspects, as shown in FIG. 12, stack series fed antenna 1220 may include a plurality of antenna layers.

In some demonstrative aspects, as shown in FIG. 12, the plurality of antenna layers may include a first antenna layer and a second antenna layer.

In some demonstrative aspects, as shown in FIG. 12, the first antenna layer may include a first plurality of serially connected antenna elements 1232.

In some demonstrative aspects, as shown in FIG. 12, the first plurality of serially connected antenna elements 1232 may include a plurality of printed antenna patches printed on the inner-side of the radome 1210.

In some demonstrative aspects, as shown in FIG. 12, the first antenna layer may include a first trace 1234 configured to drive an electrical current from a power source connector 1222 to the first plurality of serially connected antenna elements 1232. For example, the first trace 1234 may be implemented as part of a trace structure including a first trace portion 1265, which may be configured to electrically connect the power source connector 1222 to a first part, e.g., a first end, of the first plurality of serially connected antenna elements 1232; and/or a second trace portion 1266, which may be configured to electrically connect the power source connector 1222 to a second part, e.g., a second end, of the first plurality of serially connected antenna elements 1232. For example, trace portion 1266 may be connected to a first end of trace portion 1234 connecting between antenna elements 1232, and/or trace portion 1266 may be connected to a second end of the trace portion 1234 connecting between antenna elements 1232. For example, the trace structure including trace portions 1265 and 1266 may be configured to allow electrical current to flow from the power source connector 1222 via the first plurality of serially connected antenna elements 1232.

In some demonstrative aspects, as shown in FIG. 12, the second antenna layer may be covered by the inner surface of the radome 1210.

In some demonstrative aspects, as shown in FIG. 12, the second antenna layer may include a second plurality of serially connected antenna elements 1242, e.g., as described below.

In some demonstrative aspects, as shown in FIG. 12, apparatus 1201 may include a PCB 1204.

In some demonstrative aspects, as shown in FIG. 12, the second antenna layer including antenna elements 1242 may be on PCB 1204.

In some demonstrative aspects, as shown in FIG. 12, the second antenna layer may include a second trace 1244 configured to serially connect the second plurality of serially connected antenna elements 1242 to an RF chain. For example, trace 1244 may serially connect the second plurality of serially connected antenna elements 1242 to an RF chain of the plurality of Tx chains 810 (FIG. 8) or the plurality of Rx chains 812 (FIG. 8).

Some demonstrative aspects are described herein with respect to a stack series fed antenna, e.g., stack series fed antenna 1220, including a first antenna layer on an inner surface of a radome, e.g., the antenna layer including antenna elements 1222 on the inner surface of radome 1210, and a second antenna layer on a PCB, e.g., the antenna layer including antenna elements 1242 on the PCB 1204. In other aspects, the stack series fed antenna may be implemented using any other additional or alternative antenna layers. In one example, an antenna layer, e.g., including a third plurality of antenna elements of stack series fed antenna 1220, may be printed, for example, on an outer surface of the radome 1210.

In some demonstrative aspects, the first antenna layer 1230 may be configured to heat the radome 1210, for example, when the first plurality of serially connected antenna elements 1232 is subject to the electrical current via the supply source connector 1222.

In some demonstrative aspects, the first antenna layer 1230 may be configured to heat a region of the radome 1210, which may be above the first plurality of serially connected antenna elements 1232.

In some demonstrative aspects, as shown in FIG. 12, the first plurality of serially connected antenna elements 1232 may be aligned with the second plurality of serially connected antenna elements 1242.

In some demonstrative aspects, the first plurality of serially connected antenna elements 1232 and the second plurality of serially connected antenna elements 1242 may be electromagnetically coupled.

In some demonstrative aspects, as shown in FIG. 12, a count of the first plurality of serially connected antenna elements 1232 may be equal to a count of the second plurality of serially connected antenna elements 1242.

In some demonstrative aspects, as shown in FIG. 12, an arrangement of the first plurality of serially connected antenna elements 1232 in the first antenna layer may be identical to an arrangement of the second plurality of serially connected antenna elements 1242 in the second antenna layer.

In some demonstrative aspects, the second antenna layer may include, or may be implemented by, a standard low-cost PCB antenna layer on the PCB1204.

In other aspects, the second antenna layer may include a multi-layer PCB antenna.

In some demonstrative aspects, as shown in FIG. 12, the first antenna layer may include the serially connected antenna elements 1232 printed on the inner side of the radome 1210.

In some demonstrative aspects, stack series fed antenna 1220 may include two layers of serially connected antenna elements, for example, serially connected antenna elements 1232 may be connected with the trace 1234, and serially connected antenna elements 1242 may be connected with the trace 1244. This structure of stack series fed antenna 1220 may be different from a structure of stack series fed antenna 900 (FIG. 9), which may include isolated floating patches in the second layer.

In some demonstrative aspects, as shown in FIG. 12, serially connected antenna elements 1232 may be connected to the power source connector 1222, e.g., via the trace portions 1265, 1234, and 1266, for example, such that the first antenna layer including serially connected antenna elements 1232 may be operated as part of a deicer.

In some demonstrative aspects, as shown in FIG. 12, trace 1234 may connect between serially connected antenna elements 1232, for example, to create a single conductive structure, which may be used as part of the deicer, for example, to directly heat an area of radome 1210 above serially connected antenna elements 1232. For example, electrical current may flow from the power source connector 1222 via an electric circuit including the trace portion 1265, trace portion 1234, the serially connected antenna elements 1232, and trace portion 1266.

In some demonstrative aspects, operating the plurality of serially connected antenna elements 1232 as the deicer may obviate a need to maintain a keep-out distance between heating elements of the deicer and the antenna elements of stack series fed antenna 1220. This solution may provide a technical advantage for removing ice and/or humidity from radome 1210, for example, in a manner which may be more efficient and/or may consume less power, e.g., compared to a de-icing implementation utilizing a dedicated deicing structure of dedicated metallic strips, e.g., as described above with reference to FIG. 10.

In some demonstrative aspects, DC lines, e.g., formed by trace portions 1265 and 1266, may be configured to be substantially perpendicular to the antenna orientation of the stack series fed antenna 1220. For example, according to such a configuration the DC lines may not substantially affect an operation of the stack series fed antenna 1220.

For example, a current, e.g., AC current, may flow along the stack series fed antenna 1220, and may radiate an electrical field in this direction. Accordingly, substantially no AC current will flow in the DC lines, and the antenna performance may not change, e.g., after biasing the antenna.

For example, DC lines that are in the direction of the antenna may be relatively far from the antenna, and, accordingly, substantially no AC currents will flow on them.

Figure 13:
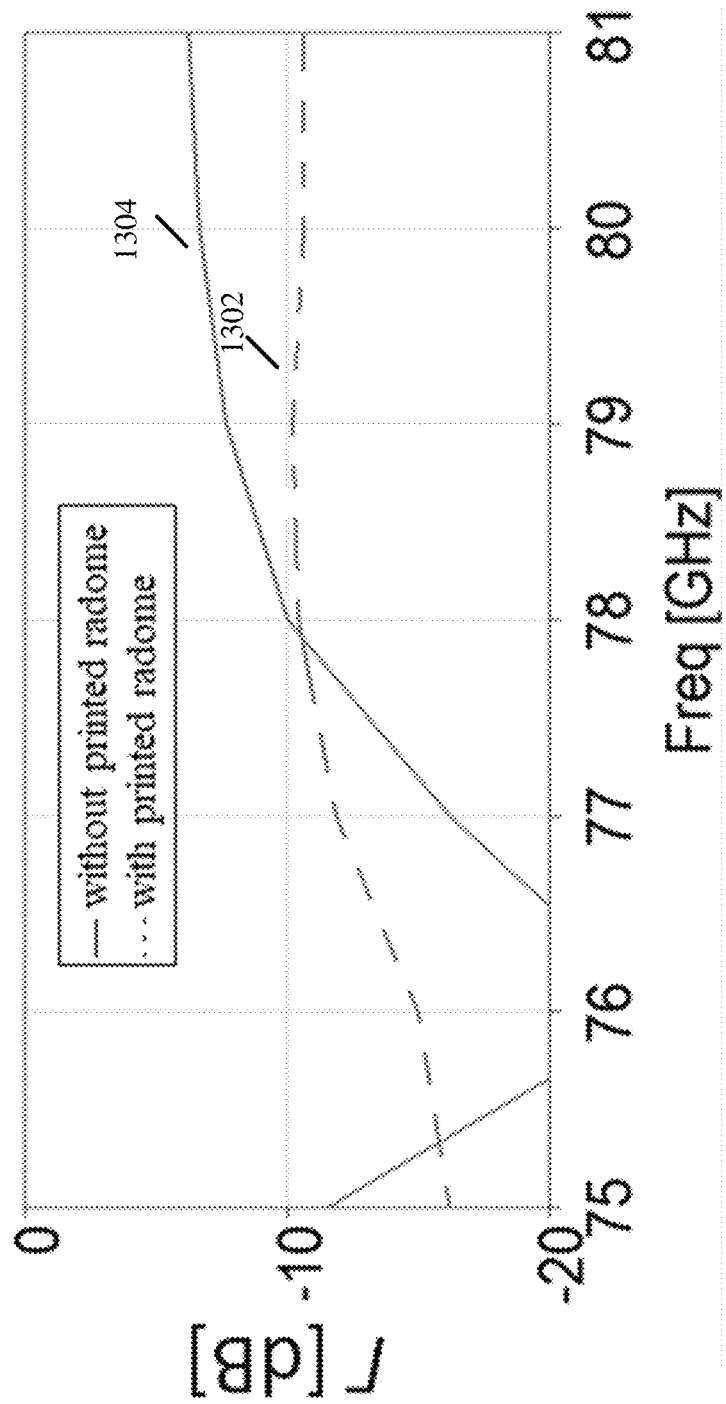
FIG. 13 is a schematic illustration of a graph depicting reflection coefficients of a stack series fed antenna, in accordance with some demonstrative aspects.

Reference is made to FIG. 13, which schematically illustrates a graph depicting reflection coefficients of a stack series fed antenna, in accordance with some demonstrative aspects.

In some demonstrative aspects, a curve 1302 depicts reflection coefficients of the stack series fed antenna, e.g., stack series fed antenna 1220 (FIG. 12).

In some demonstrative aspects, a curve 1304 depicts reflection coefficients of a second layer of the stack series fed antenna, for example, when removing a first layer of the stack series fed antenna. For example, curve 1302 may depict reflection coefficients of serially connected antenna elements 1242 (FIG. 12), for example, when the serially connected antenna elements 1232 (FIG. 12) are removed.

In one example, a typical thickness of a radome, e.g., radome 1210 (FIG. 12), may be above 1 mm, for example, due to mechanical considerations. This thickness may not be a negligible part of a wavelength, e.g., when operating in a 76-81 GHz automotive radar band.

In some demonstrative aspects, as shown in FIG. 13, the stack series fed antenna may be operable to cover an entire range of the 76-81 GHz automotive radar band, for example, even when serially connected antenna elements 1232 (FIG. 12) are printed on a radome, e.g., radome 1210 (FIG. 12), with a thickness of 1 mm.

In some demonstrative aspects, as shown in FIG. 13, the stack series fed antenna of FIG. 12 may support a modular approach, in which the stack series fed antenna may operate in a narrower bandwidth, for example, when the printed antenna elements on the radome are removed.

In another example, this modular configuration of the stack series fed antenna may allow to support several types of printed radomes, for example, even without changing the antenna layer on the PCB.

In another example, the modular configuration of the stack series fed antenna may allow to replace any bare radome of a narrow-band antenna, with a printed radome, e.g., without changing the antenna layer on the PCB, which may enhance a bandwidth of the narrow-band antenna. This technical solution may be advantageous, for example, compared to stack series fed antenna 900 (FIG. 9), where removing the floating antenna layer may result in an unmatched antenna.

Figure 14:
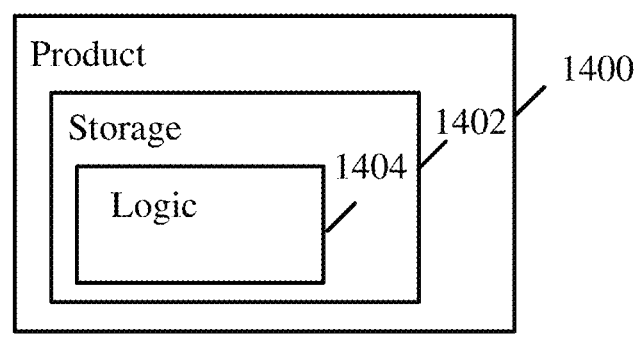
FIG. 14 is a schematic illustration of a product of manufacture, in accordance with some demonstrative aspects.

Reference is made to FIG. 14, which schematically illustrates a product of manufacture 1400, in accordance with some demonstrative aspects. Product 1400 may include one or more tangible computer-readable ("machine-readable") non-transitory storage media 1402, which may include computer-executable instructions, e.g., implemented by logic 1404. The computer-executable instructions, e.g., implemented by logic 1404, may be operable to, when executed by at least one computer processor, enable the at least one computer processor to implement one or more operations at a vehicle, e.g., vehicle 100 (FIG. 1), a radar device, e.g., radar device 101 (FIG. 1), a controller, e.g., controller 1150 (FIG. 11), and/or a processor, e.g., radar processor 834 (FIG. 8) and/or processor 836 (FIG. 8); to cause a vehicle, e.g., vehicle 100 (FIG. 1), a radar device, e.g., radar device 101 (FIG. 1), a controller, e.g., controller 1150 (FIG. 11), and/or a processor, e.g., radar processor 834 (FIG. 8) and/or processor 836 (FIG. 8), to perform, trigger and/or implement one or more operations and/or functionalities; and/or to perform, trigger and/or implement one or more operations and/or functionalities described with reference to one or more of the FIGS. 1-13, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1400 and/or storage media 1402 may include one or more types of computer-readable storage media capable of storing data, including volatile memory, non-volatile memory, removable or non-removable memory, erasable or non-erasable memory, writeable or re-writeable memory, and the like. For example, storage media 1402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1404 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, and the like.

EXAMPLES

The following examples pertain to further aspects.

Example 1 includes an apparatus comprising a radome; and a stack series fed antenna comprising a plurality of antenna layers, the plurality of antenna layers comprising a first antenna layer on an inner surface of the radome, the first antenna layer comprising a first plurality of serially connected antenna elements, and a first trace configured to drive an electrical current from a power source to the first plurality of serially connected antenna elements; and a second antenna layer covered by the inner surface of the radome, the second antenna layer comprising a second plurality of serially connected antenna elements, and a second trace configured to serially connect the second plurality of serially connected antenna elements to a Radio Frequency (RF) chain.

Example 2 includes the subject matter of Example 1, and optionally, wherein the first antenna layer is configured to heat the radome when the first plurality of serially connected antenna elements is subject to the electrical current.

Example 3 includes the subject matter of Example 1 or 2, and optionally, wherein the first antenna layer is configured to heat a region of the radome when the first plurality of serially connected antenna elements is subject to the electrical current, wherein the region of the dome is above the first plurality of serially connected antenna elements.

Example 4 includes the subject matter of any one of Examples 1-3, and optionally, wherein the first plurality of serially connected antenna elements are aligned with the second plurality of serially connected antenna elements.

Example 5 includes the subject matter of any one of Examples 1-4, and optionally, wherein the first plurality of serially connected antenna elements and the second plurality of serially connected antenna elements are electromagnetically coupled.

Example 6 includes the subject matter of any one of Examples 1-5, and optionally, wherein a count of the first plurality of serially connected antenna elements is equal to a count of the second plurality of serially connected antenna elements.

Example 7 includes the subject matter of any one of Examples 1-6, and optionally, wherein an arrangement of the first plurality of serially connected antenna elements in the first antenna layer is identical to an arrangement of the second plurality of serially connected antenna elements in the second antenna layer.

Example 8 includes the subject matter of any one of Examples 1-7, and optionally, wherein the first plurality of serially connected antenna elements comprises a plurality of printed antenna elements printed on the inner-side of the radome.

Example 9 includes the subject matter of any one of Examples 1-8, and optionally, wherein the radome comprises a dielectric layer, and wherein the first antenna layer is on the dielectric layer.

Example 10 includes the subject matter of Example 9, and optionally, wherein the first antenna layer is between the dielectric layer and the second antenna layer.

Example 11 includes the subject matter of any one of Examples 1-10, and optionally, wherein the second antenna layer is configured for narrow-band communication in a frequency bandwidth between 76 Gigahertz (GHz) and 77 GHz.

Example 12 includes the subject matter of Example 11, and optionally, wherein the stack series fed antenna is configured for wide-band communication in a frequency bandwidth between 76 GHz and 81 GHz.

Example 13 includes the subject matter of any one of Examples 1-12, and optionally, comprising a Printed Circuit Board (PCB), wherein the second antenna layer is on the PCB.

Example 14 includes the subject matter of any one of Examples 1-13, and optionally, comprising a temperature sensor configured to sense a temperature of the radome, and a controller configured to control the electrical current to the first plurality of serially connected antenna elements based on the temperature of the radome.

Example 15 includes the subject matter of any one of Examples 1-14, and optionally, comprising a stack series fed antenna array, wherein the first antenna layer comprises a first plurality of antenna sub-arrays, an antenna sub-array of the first plurality of antenna sub-arrays comprising the first plurality of serially connected antenna elements, wherein the first trace is to drive the electrical current to the first plurality of antenna sub-arrays, wherein the second antenna layer comprises a second plurality of antenna sub-arrays, an antenna sub-array of the second plurality of antenna sub-arrays comprising the second plurality of serially connected antenna elements, and wherein the second antenna layer comprises a plurality of second traces to connect the second plurality of antenna sub-arrays to a respective plurality of RF chains.

Example 16 includes the subject matter of Example 15, and optionally, wherein the stack series fed antenna array comprises a Multiple-Input-Multiple Output MIMO antenna array comprising one or more transmit (Tx) antenna arrays and one or more receive (Rx) antenna arrays.

Example 17 includes the subject matter of Example 15 or 16, and optionally, comprising a processor configured to control communication of radar signals via the stack series fed antenna array, and to generate radar information based on the radar signals.

Example 18 includes the subject matter of Example 17, and optionally, comprising a vehicle, the vehicle comprising a system controller to control one or more systems of the vehicle based on the radar information.

Example 19 includes an apparatus comprising means for executing any of the described operations of one or more of Examples 1-18.

Example 20 includes a machine-readable medium that stores instructions for execution by a processor to perform any of the described operations of one or more of Examples 1-18.

Example 21 includes an apparatus comprising a memory; and processing circuitry configured to perform any of the described operations of one or more of Examples 1-18.

Example 22 includes a method including any of the described operations of one or more of Examples 1-18.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
   a radome; and
   a stack series fed antenna comprising a plurality of antenna layers, the plurality of antenna layers comprising:
   a first antenna layer on an inner surface of the radome, the first antenna layer comprising a first plurality of serially connected antenna elements, and a first trace configured to drive an electrical current from a power source to the first plurality of serially connected antenna elements; and
   a second antenna layer covered by the inner surface of the radome, the second antenna layer comprising a second plurality of serially connected antenna elements, and a second trace configured to serially connect the second plurality of serially connected antenna elements to a Radio Frequency (RF) chain.

2. The apparatus of claim 1, wherein the first antenna layer is configured to heat the radome when the first plurality of serially connected antenna elements is subject to the electrical current.

3. The apparatus of claim 1, wherein the first antenna layer is configured to heat a region of the radome when the first plurality of serially connected antenna elements is subject to the electrical current, wherein the region of the dome is above the first plurality of serially connected antenna elements.

4. The apparatus of claim 1, wherein the first plurality of serially connected antenna elements are aligned with the second plurality of serially connected antenna elements.

5. The apparatus of claim 1, wherein the first plurality of serially connected antenna elements and the second plurality of serially connected antenna elements are electromagnetically coupled.

6. The apparatus of claim 1, wherein a count of the first plurality of serially connected antenna elements is equal to a count of the second plurality of serially connected antenna elements.

7. The apparatus of claim 1, wherein an arrangement of the first plurality of serially connected antenna elements in the first antenna layer is identical to an arrangement of the second plurality of serially connected antenna elements in the second antenna layer.

8. The apparatus of claim 1, wherein the first plurality of serially connected antenna elements comprises a plurality of printed antenna elements printed on the inner-side of the radome.

9. The apparatus of claim 1, wherein the radome comprises a dielectric layer, and wherein the first antenna layer is on the dielectric layer.

10. The apparatus of claim 9, wherein the first antenna layer is between the dielectric layer and the second antenna layer.

11. The apparatus of claim 1, wherein the second antenna layer is configured for narrow-band communication in a frequency bandwidth between 76 Gigahertz (GHz) and 77 GHz.

12. The apparatus of claim 11, wherein the stack series fed antenna is configured for wide-band communication in a frequency bandwidth between 76 GHz and 81 GHz.

13. The apparatus of claim 1 comprising a Printed Circuit Board (PCB), wherein the second antenna layer is on the PCB.

14. The apparatus of claim 1 comprising a temperature sensor configured to sense a temperature of the radome, and a controller configured to control the electrical current to the first plurality of serially connected antenna elements based on the temperature of the radome.

15. The apparatus of claim 1 comprising a stack series fed antenna array, wherein the first antenna layer comprises a first plurality of antenna sub-arrays, an antenna sub-array of the first plurality of antenna sub-arrays comprising the first plurality of serially connected antenna elements, wherein the first trace is to drive the electrical current to the first plurality of antenna sub-arrays, wherein the second antenna layer comprises a second plurality of antenna sub-arrays, an antenna sub-array of the second plurality of antenna sub-arrays comprising the second plurality of serially connected antenna elements, and wherein the second antenna layer comprises a plurality of second traces to connect the second plurality of antenna sub-arrays to a respective plurality of RF chains.

16. The apparatus of claim 15, wherein the stack series fed antenna array comprises a Multiple-Input-Multiple Output MIMO antenna array comprising one or more transmit (Tx) antenna arrays and one or more receive (Rx) antenna arrays.

17. The apparatus of claim 15 comprising a processor configured to control communication of radar signals via the stack series fed antenna array, and to generate radar information based on the radar signals.

18. A vehicle comprising:
    a system controller configured to control one or more vehicular systems of the vehicle based on radar information; and a radar device configured to provide the radar information to the system controller, the radar device comprising:
- a radome;
- a stack series fed antenna comprising a plurality of antenna layers, the plurality of antenna layers comprising:
  - a first antenna layer on an inner surface of the radome, the first antenna layer comprising a first plurality of serially connected antenna elements, and a first trace configured to drive an electrical current from a power source to the first plurality of serially connected antenna elements; and
  - a second antenna layer covered by the inner surface of the radome, the second antenna layer comprising a second plurality of serially connected antenna elements, and a second trace configured to serially connect the second plurality of serially connected antenna elements to a Radio Frequency (RF) chain; and
- a processor configured to generate the radar information based on input radar data, the input radar data based on radar signals communicated by the stack series fed antenna.

19. The vehicle of claim 18, wherein the first antenna layer is configured to heat the radome when the first plurality of serially connected antenna elements is subject to the electrical current.

20. The vehicle of claim 18 comprising a temperature sensor configured to sense a temperature of the radome, and a controller configured to control the electrical current to the first plurality of serially connected antenna elements based on the temperature of the radome.

21. The vehicle of claim 18, wherein the first plurality of serially connected antenna elements comprises a plurality of printed antenna elements printed on the inner-side of the radome.

22. The vehicle of claim 18, wherein the radar device comprises a stack series fed antenna array, wherein the first antenna layer comprises a first plurality of antenna sub-arrays, an antenna sub-array of the first plurality of antenna sub-arrays comprising the first plurality of serially connected antenna elements, wherein the first trace is to drive the electrical current to the first plurality of antenna sub-arrays, wherein the second antenna layer comprises a second plurality of antenna sub-arrays, an antenna sub-array of the second plurality of antenna sub-arrays comprising the second plurality of serially connected antenna elements, and wherein the second antenna layer comprises a plurality of second traces to connect the second plurality of antenna sub-arrays to a respective plurality of RF chains.

23. The vehicle of claim 22, wherein the stack series fed antenna array comprises a Multiple-Input-Multiple Output MIMO antenna array comprising one or more transmit (Tx) antenna arrays and one or more receive (Rx) antenna arrays.

* * * * *